United States Patent
Park et al.

(10) Patent No.: US 12,509,161 B2
(45) Date of Patent: Dec. 30, 2025

(54) UNDERBODY FOR VEHICLE

(71) Applicants: Hyundai Motor Company, Seoul (KR); Kia Corporation, Seoul (KR)

(72) Inventors: Tae Ou Park, Seongnam-si (KR); Dong Ha Kang, Seoul (KR); Cheol Ung Lee, Hwaseong-si (KR); Sea Cheoul Song, Ansan-si (KR); Do Hoi Kim, Sejong-si (KR); Dae Ho Lee, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 406 days.

(21) Appl. No.: 18/300,695

(22) Filed: Apr. 14, 2023

(65) Prior Publication Data
US 2024/0166270 A1    May 23, 2024

(30) Foreign Application Priority Data

Nov. 21, 2022  (KR) .......................... 10-2022-0156551

(51) Int. Cl.
*B62D 25/18*    (2006.01)
*B62D 25/08*    (2006.01)

(52) U.S. Cl.
CPC .......... *B62D 25/088* (2013.01); *B62D 25/18* (2013.01)

(58) Field of Classification Search
CPC ...................................................... B62D 25/18
See application file for complete search history.

(56) References Cited

U.S. PATENT DOCUMENTS

| | | | | |
|---|---|---|---|---|
| 8,287,035 | B2* | 10/2012 | Bufe | B62D 25/16 296/192 |
| 10,940,890 | B2* | 3/2021 | Tsukamoto | B62D 21/11 |
| 10,953,925 | B2* | 3/2021 | Park | B62D 21/15 |
| 11,325,650 | B2* | 5/2022 | Hong | B62D 21/11 |
| 12,187,341 | B2* | 1/2025 | Park | B62D 25/088 |
| 2010/0156146 | A1* | 6/2010 | Matsuyama | B62D 25/20 296/193.07 |
| 2016/0375484 | A1* | 12/2016 | Fickel | B22C 1/00 164/369 |
| 2023/0174159 | A1* | 6/2023 | Park | B60R 19/48 296/187.09 |
| 2025/0196931 | A1* | 6/2025 | Lee | B62D 25/2027 |

FOREIGN PATENT DOCUMENTS

| | | | | |
|---|---|---|---|---|
| DE | 102013220319 | A1 * | 4/2015 | .......... B62D 25/088 |
| DE | 102022122005 | A1 * | 6/2023 | .......... B62D 21/155 |
| KR | 101776489 | B1 | 9/2017 | |
| KR | 102756459 | B1 * | 1/2025 | ............ B62D 25/20 |

* cited by examiner

*Primary Examiner* — Aaron L Lembo
(74) *Attorney, Agent, or Firm* — Slater Matsil, LLP

(57) ABSTRACT

Disclosure is an underbody for a vehicle. The underbody includes side members formed long at opposite lateral portions of a vehicle body in a longitudinal direction of the vehicle body, and hollow cross members formed long in a transverse direction of the vehicle body, and integrally connected to the two side members.

20 Claims, 12 Drawing Sheets

UNDERBODY FOR VEHICLE

CROSS-REFERENCE TO RELATED APPLICATIONS

The present application claims priority to Korean Patent Application No. 10-2022-0156551, filed Nov. 21, 2022, the entire contents of which is incorporated herein for all purposes by this reference.

TECHNICAL FIELD

The present invention relates to a body structure of a vehicle.

BACKGROUND

A body of a vehicle receives and protects passengers and cargo, and a monocoque body is configured to additionally serve a function of supporting chassis components such as an engine, a transmission, etc.

Therefore, in preparation for a crash of a vehicle, the body must be able to provide sufficient rigidity to protect a passenger compartment and firmly support the chassis components.

Furthermore, it is preferable that the body is made as lightweight as possible so as to improve the fuel efficiency or electricity efficiency of a vehicle and increase the cruising range.

The foregoing is intended merely to aid in the understanding of the background of the present invention, and is not intended to mean that the present invention falls within the purview of the related art that is already known to those skilled in the art.

SUMMARY

The present invention is intended to provide an underbody for a vehicle, the underbody being capable of improving fuel efficiency or electricity efficiency of a vehicle and increasing a cruising range and improving safety of a passenger by being made as lightweight as possible as, and by being configured to protect a passenger compartment and stably and firmly support chassis components, thereby, eventually, significantly increasing the productivity of a vehicle.

Furthermore, in order to achieve the objective, there is provided an underbody for a vehicle, the underbody including: side members formed long at opposite lateral portions of a vehicle body in a longitudinal direction of the vehicle body; and hollow cross members formed long in a transverse direction of the vehicle body, and integrally connected to the two side members.

The cross members may include a plurality of cross members provided in parallel.

Each of the side members may include a suspension mounting to mount a suspension device; wherein the suspension mounting may be formed in a ring shape having a hollow closed section.

The suspension mounting may consist of a hollow ring of a form in which a ring-shaped hollow portion may extend from an upper portion to a lower portion of each of the side members such that a center portion may be open downward.

The cross members may include two cross members disposed in parallel in the longitudinal direction of the vehicle body; and the suspension mounting may be disposed between portions of each of the side members to which the cross members may be respectively connected.

A plurality of ring support ribs may be provided at periphery of the hollow ring, and the plurality of ring support ribs may be formed to support the hollow ring.

Sub frame mountings may be respectively provided on the portions of each of the side members to which the cross members may be respectively connected.

Each of the sub frame mountings may include a boss configured to mount a sub frame; wherein a closed space may be provided around the boss.

A boss support rib may be provided in the closed space around the boss to support and be connected to the boss.

The boss support rib may be formed to divide the closed space into a plurality of spaces.

A plurality of partition walls may be provided inside each of the hollow cross members, so that the inside space may be divided into a plurality of sealed chambers by the plurality of partition walls.

A plurality of member ribs may be formed inside each of the hollow cross members, thereby improving rigidity of each of the cross members.

An enlarged sectional portion may be provided a portion where each of the cross members may be connected to each of the side members, and a section of the enlarged sectional portion may be enlarged in a longitudinal direction of each of the side members.

The cross members may include two cross members that may be provided to be spaced apart from each other in the longitudinal direction of the vehicle body; each of the side members may include a suspension mounting provided between portions thereof, to which the cross members are respectively connected, to support a suspension device; each of the side members may be formed such that a portion with the suspension mounting may be relatively bent upward; and each of the cross members may consist of a hollow section including an inclined portion extending gradually downward from the portion with the suspension mounting toward a front portion and a rear portion of the vehicle body.

A wheel housing inner shell may be integrally formed at an upper lateral portion of each of the side members.

Manufacturing thereof may be performed by die casting so that an inside space of each of the hollow cross members may be formed by a salt core.

Manufacturing thereof may be performed by die casting so that the ring-shaped hollow portion of the suspension mounting may be formed by a salt core.

Manufacturing thereof may be performed by die casting so that the closed space of the boss may be formed by a salt core.

Furthermore, in order to achieve the objective, there is provided a vehicle body including: an underbody, wherein, among a front portion and a rear portion of the underbody, a first portion may be connected to a center floor panel, and a shock absorbing member connector may be provided at a second portion.

The underbody may be provided at each of a front portion and a rear portion of the vehicle body.

According to the present invention, the underbody for a vehicle is configured to be made as lightweight as possible as, and to protect a passenger compartment and stably and firmly support chassis components. Therefore, fuel efficiency or electricity efficiency of a vehicle can be improved and a cruising range can be increased and safety of a passenger can be improved, and, eventually, the productivity of a vehicle can be significantly increased.

BRIEF DESCRIPTION OF THE DRAWINGS

FIG. 1o is a view showing a section of a sub frame mounting at the rear side in the view point of FIG. 1;

DETAILED DESCRIPTION OF ILLUSTRATIVE EMBODIMENTS

Figure 1:
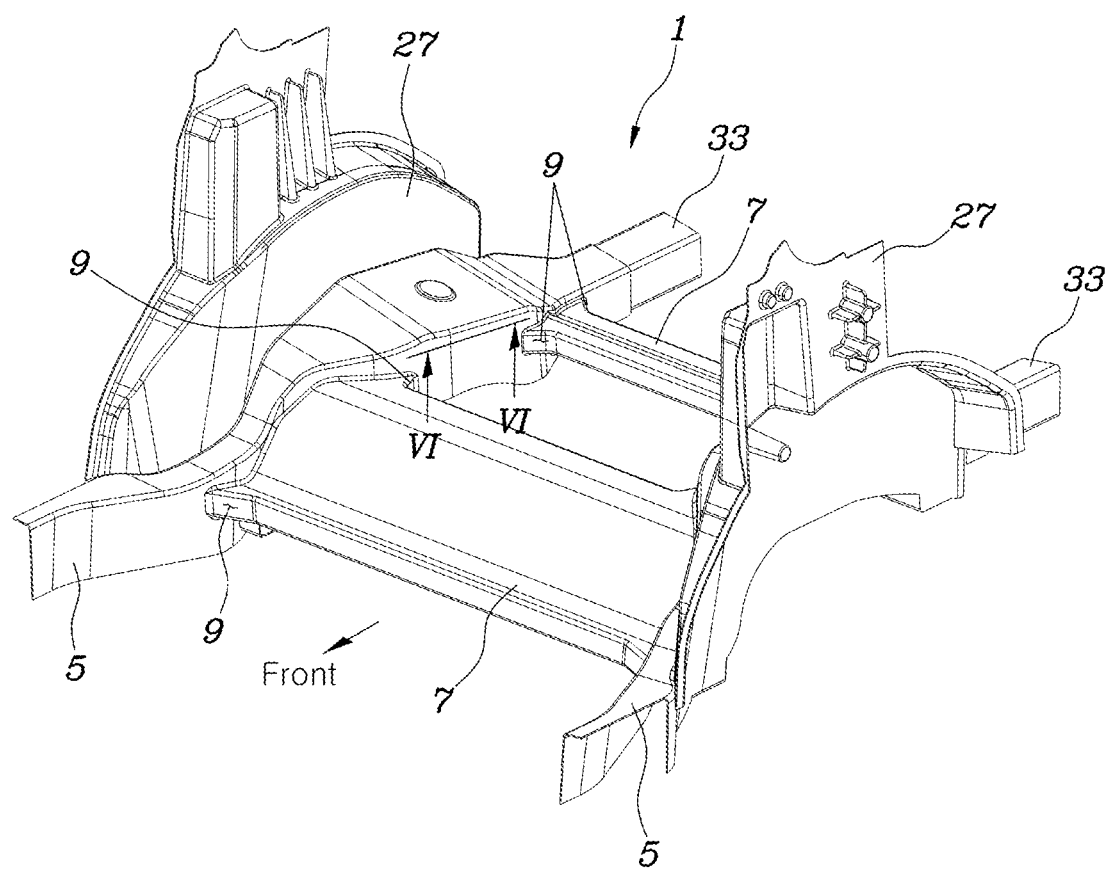
FIG. 1 is a view showing an underbody for a vehicle according to an embodiment of the present invention.

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module" and "part" for the components used in the following description are given or mixed in consideration of only the ease of writing the specification, and do not have distinct meanings or roles by themselves.

In the following description, if it is decided that the detailed description of known function or configuration related to the invention makes the subject matter of the invention unclear, the detailed description is omitted. Furthermore, the accompanying drawings are only for understanding of the preferred embodiment of the present invention, and the technical ideas disclosed in the specification are not limited by the accompanying drawings, and those skilled in the art will appreciate that various modifications, additions and substitutions are possible, without departing from the scope and spirit of the invention as disclosed in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 2:
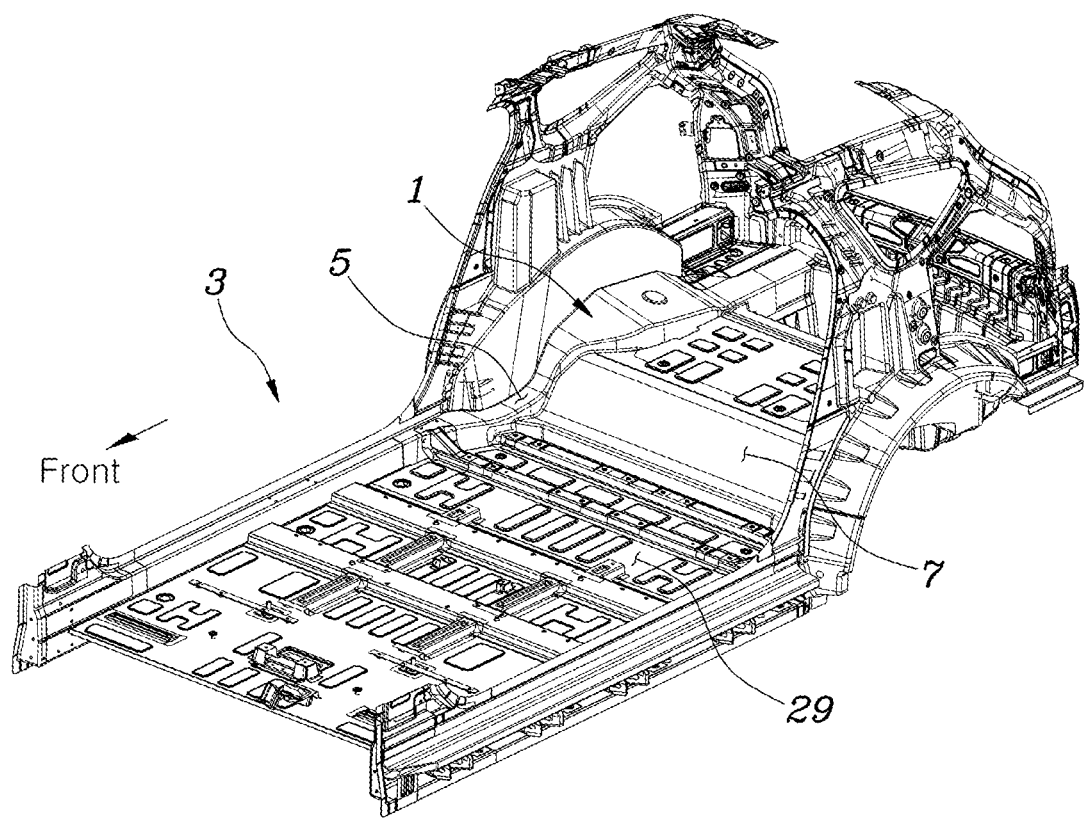
FIG. 2 is a view showing a part of a vehicle body to which the underbody of FIG. 1 is applied.
Figure 3:
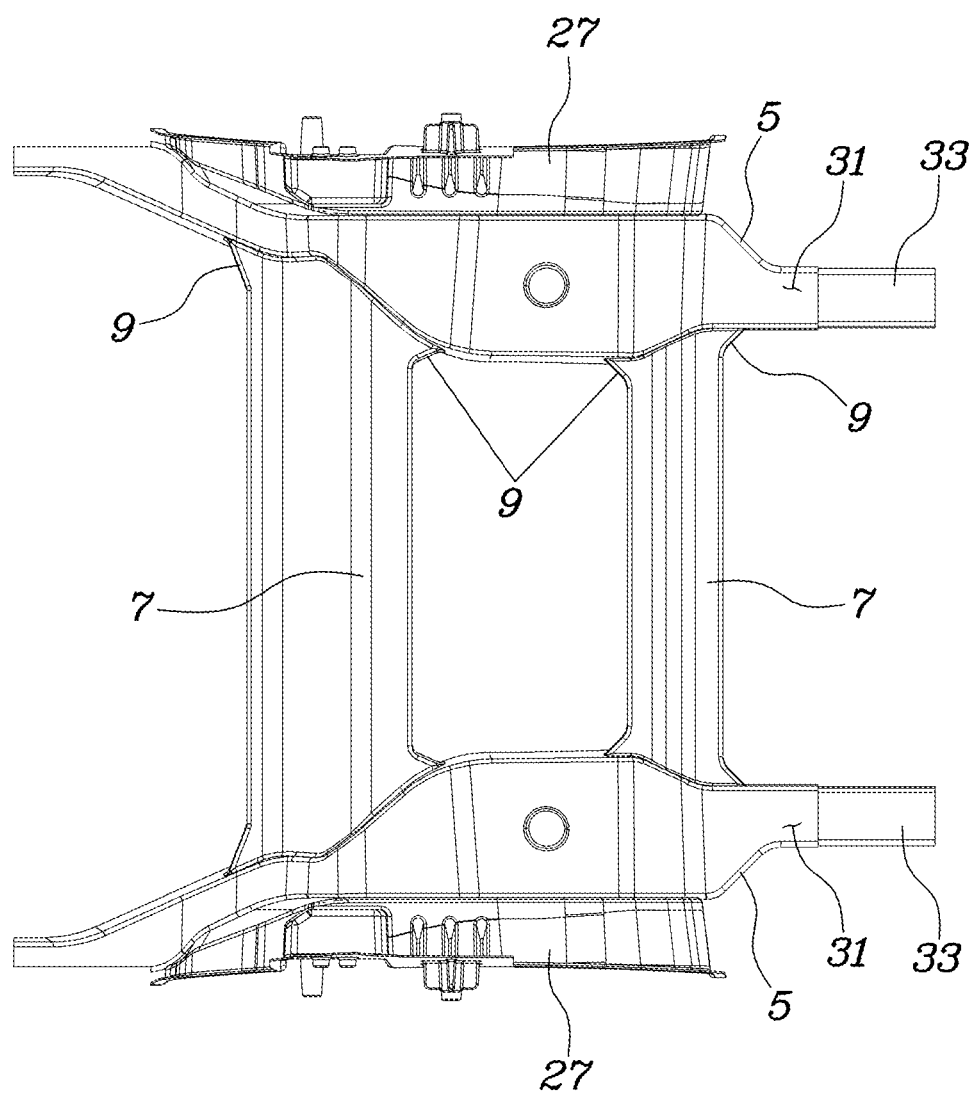
FIG. 3 is a plane view showing the underbody of FIG. 1.
Figure 4:
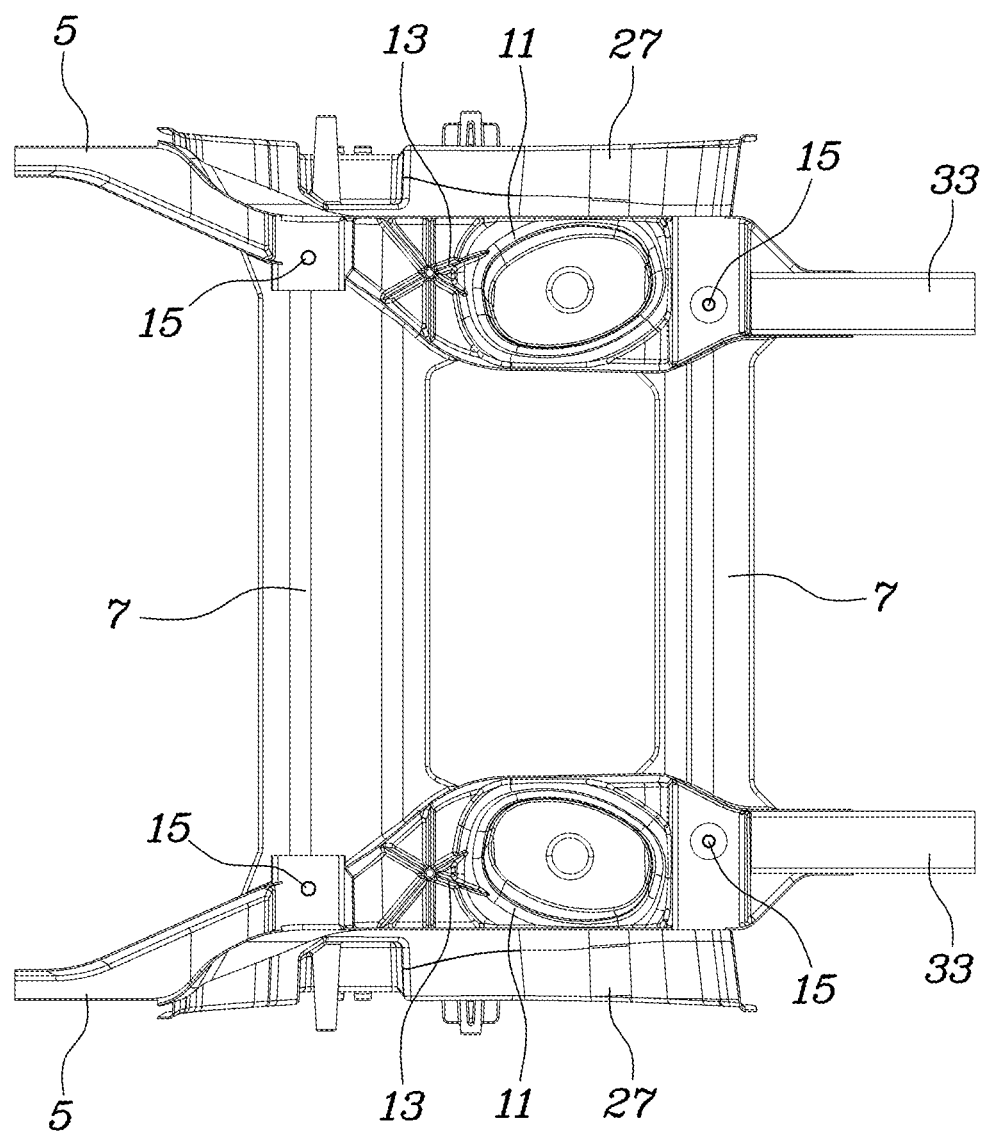
FIG. 4 is a bottom view showing the underbody of FIG. 1.
Figure 5:
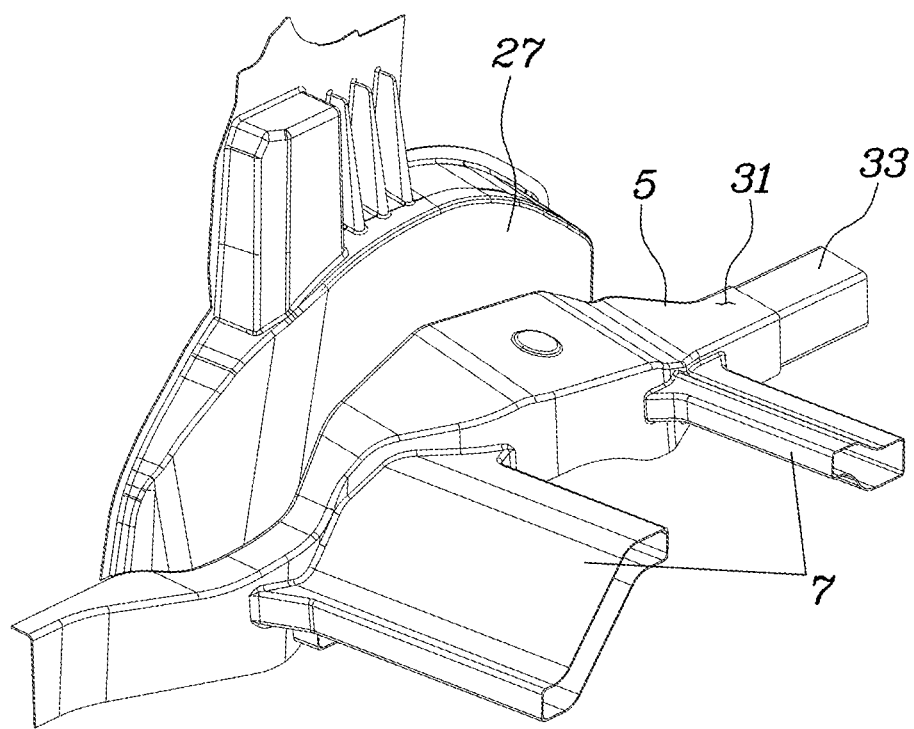
FIG. 5 is a view showing a section of a cross member of the underbody of FIG. 1.
Figure 6:
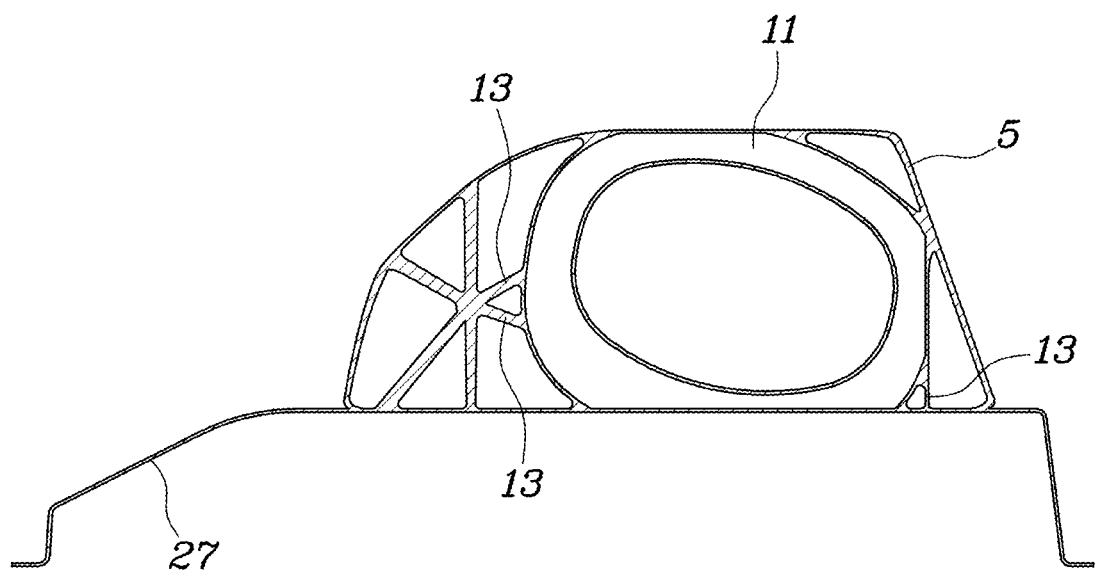
FIG. 6 is a sectional view taken along line VI-VI of FIG. 1, and the view showing a section of a hollow ring constituting a suspension mounting.
Figure 7:
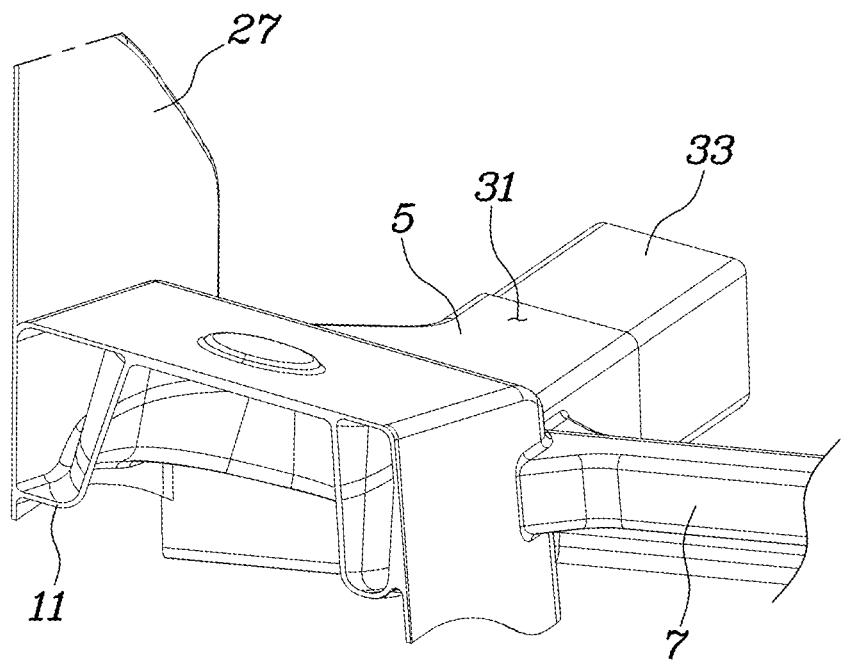
FIG. 7 is a view showing a section of the suspension mounting in a view point of FIG. 1.
Figure 8:
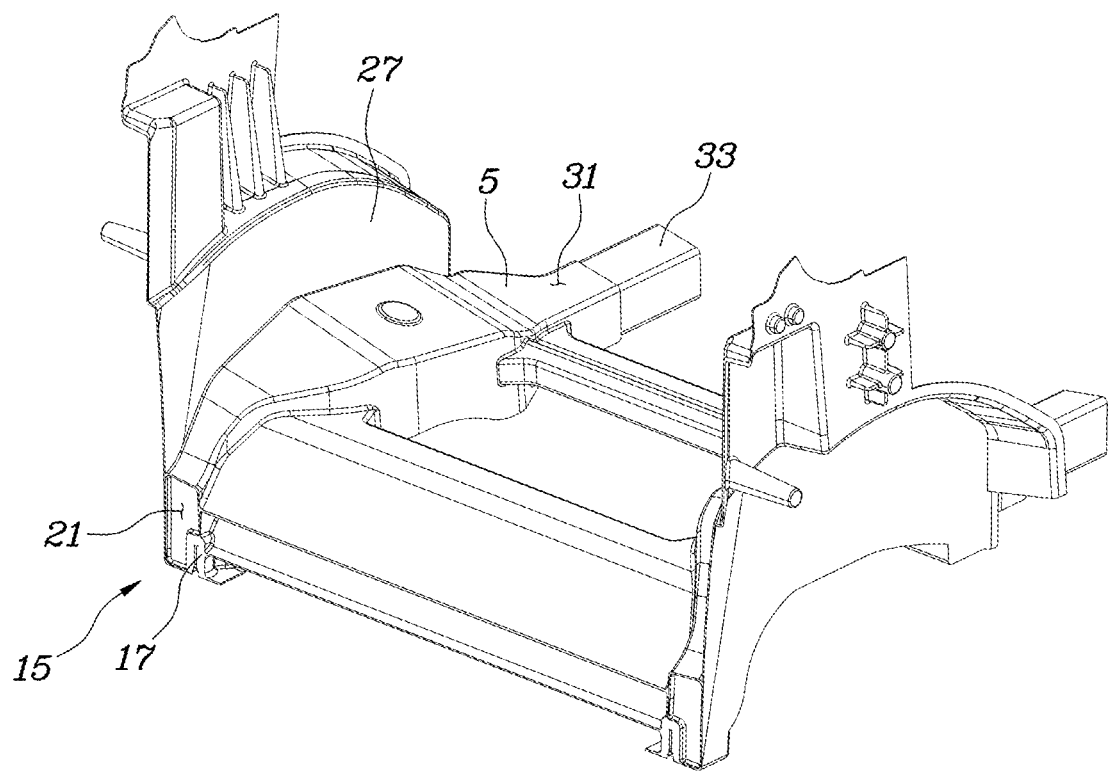
FIG. 8 is a view showing a section of a sub frame mounting at the front side in the view point of FIG. 1.
Figure 9:
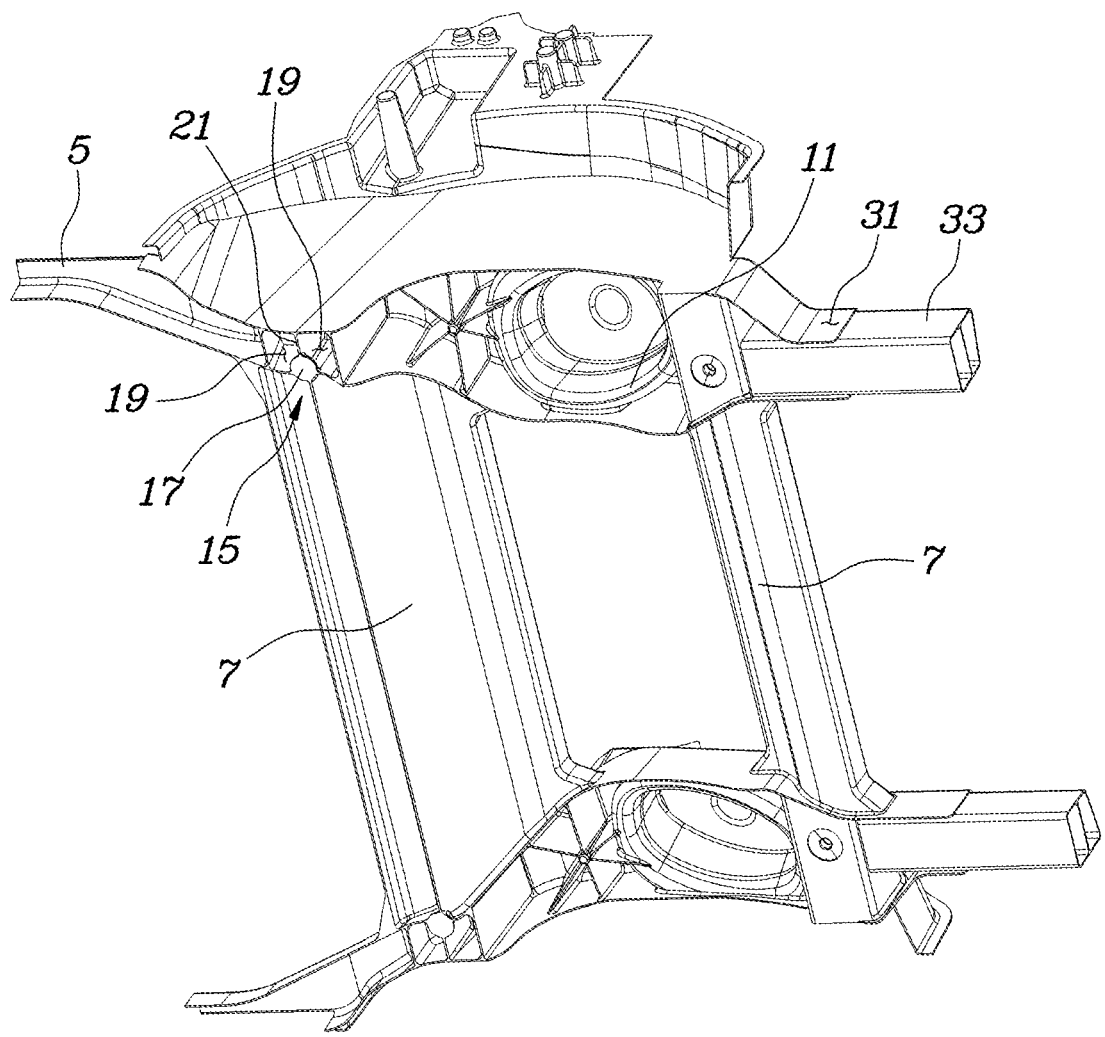
FIG. 9 is a lower side view showing the underbody of FIG. 1, the view showing a section of the sub frame mounting at the front side.
Figure 11:
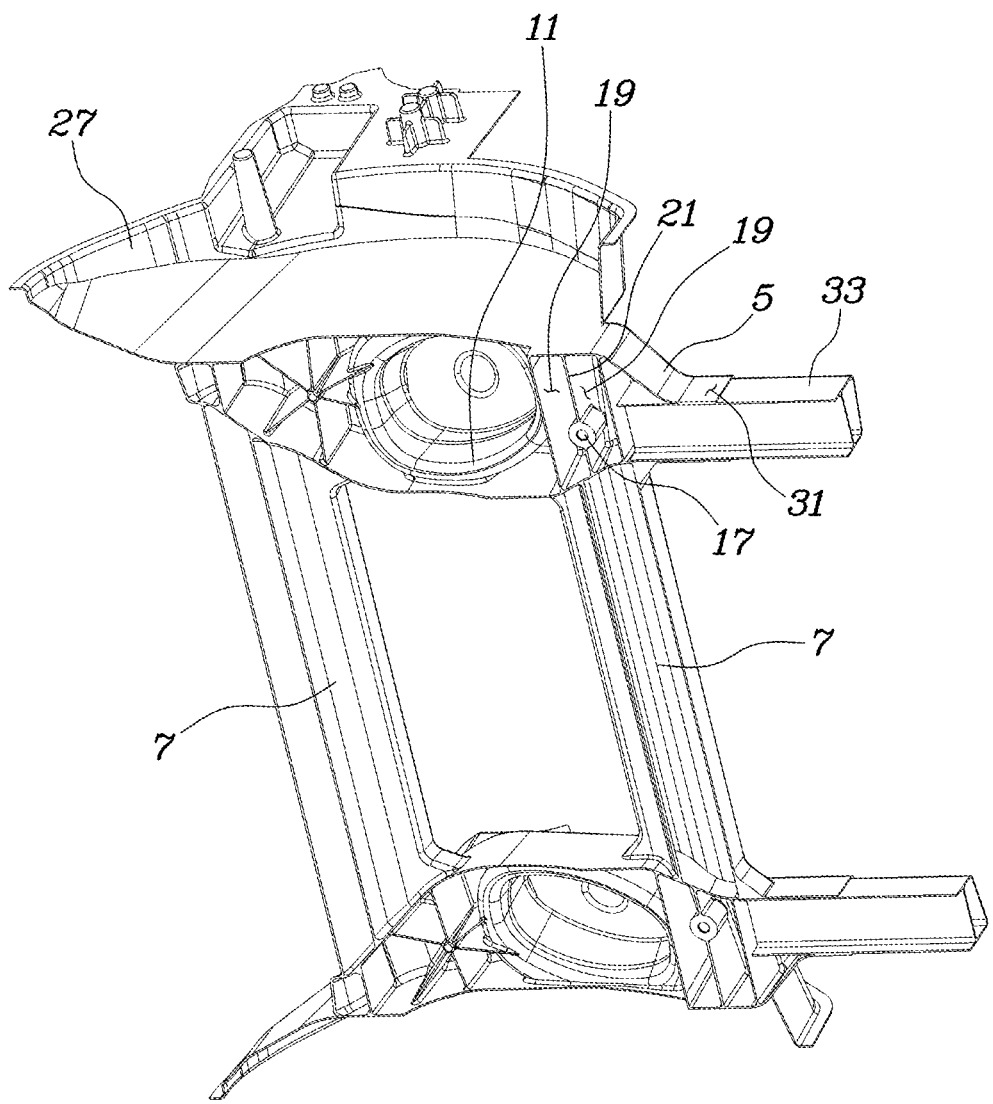
FIG. 11 is a lower side view showing the underbody of FIG. 1, the view showing a section of the sub frame mounting at the rear side.

FIG. 1 is a view showing an underbody for a vehicle according to an embodiment of the present invention. FIG. 2 is a view showing a part of a vehicle body to which the underbody of FIG. 1 is applied. FIG. 3 is a plane view showing the underbody of FIG. 1. FIG. 4 is a bottom view showing the underbody of FIG. 1. FIG. 5 is a view showing a section of a cross member of the underbody of FIG. 1. FIG. 6 is a sectional view taken along line VI-VI of FIG. 1, and the view showing a section of a hollow ring constituting a suspension mounting. FIG. 7 is a view showing a section of the suspension mounting in a view point of FIG. 1. FIG. 8 is a view showing a section of a sub frame mounting at the front side in the view point of FIG. 1. FIG. 9 is a lower side view showing the underbody of FIG. 1, the view showing a section of the sub frame mounting at the front side. FIG. 1o is a view showing a section of a sub frame mounting at the rear side in the view point of FIG. 1. FIG. 11 is a lower side view showing the underbody of FIG. 1, the view showing a section of the sub frame mounting at the rear side.

Referring to FIGS. 1 to 11, an underbody 1 for a vehicle of the present invention includes: side members 5 formed longitudinally long at opposite lateral portions of a vehicle body 3; and a hollow cross member 7 formed transversely long to the vehicle body 3 and integrally connected to the side members 5.

In other words, the underbody of the present invention consists of the side members 5 and the cross member 7 that are provided to be integrated with each other, and particularly, the cross member 7 has a hollow structure and a closed section. Therefore, in comparison to a case with a solid core structure, the present invention secures a structural rigidity at the same level as the solid core structure and can reduce significantly weight of the underbody. Therefore, while the rigidity required for the vehicle body can be sufficiently secured, the weight can be significantly reduced.

As described above, the structure with the side members 5 and the hollow cross member 7 that are integrated with each other may be formed by die casting in which the hollow portion is formed by a salt core.

For example, after the die casting, casting is hardened, and then the salt core is melted by spraying water, so that the above-described hollow structure can be formed.

An enlarged sectional portion 9 is provided at a portion where the cross member 7 is connected to each of the side members 5. The enlarged sectional portion 9 has a section enlarged in a longitudinal direction of each of the side members 5.

Therefore, the enlarged sectional portion 9 allows the cross member 7 to be smoothly connected to each of the side members 5 to prevent stress concentration at the connecting portion. Therefore, the rigidity and the durability of the underbody 1 can be further improved.

In the embodiment, the cross member 7 includes a plurality of cross members 7 provided in parallel to each other, and each of the side members 5 includes a suspension mounting for mounting a suspension device.

For example, in the example of FIG. 1, the two cross members 7 are disposed perpendicular to a longitudinal direction of the vehicle body and the cross members 7 are parallel to each other. The suspension mounting is disposed between portions of each of the side members 5 to which the two cross members 7 are connected.

The suspension mounting is formed into a ring shape having a hollow closed section.

In other words, as shown in FIG. 6, the suspension mounting has a structure of a hollow ring 11 formed by extending a ring-shaped hollow portion from an upper portion to a lower portion of each of the side members 5 such that a center portion is open downward.

Therefore, while an upper end of a shock absorber constituting the suspension device is inserted in the hollow ring 11, the suspension device can be firmly fixed.

A plurality of ring support ribs 13 is provided at the periphery of the hollow ring 11, and the plurality of ring support ribs 13 is formed to support the hollow ring 11.

Therefore, the suspension mounting firmly supports the suspension device by the rigidity of the hollow ring n and the rigidity supplied from the ring support ribs 13. The inside portion of the hollow ring 11 is a space, so that weight of the vehicle body can be significantly reduced.

For example, manufacturing may be performed by die casting so that the ring-shaped hollow portion of the suspension mounting is formed by a salt core.

Sub frame mountings 15 are provided at portions of the side members 5 to which the two cross members 7 are respectively connected.

Therefore, one sub frame mounting 15 is provided at a front portion of each of the side members 5, and one sub frame mounting 15 is also provided at a rear portion thereof.

A separate sub frame may be mounted to a lower portion of the underbody 1 so as to mount a chassis component, and a coupling bolt, etc. may be fastened or mounted to each of the sub frame mountings 15 to be coupled to the sub frame.

Each of sub frame mounting 15 includes a boss 17 to mount the sub frame; and a closed space 19 is provided around the boss 17.

Furthermore, a boss support rib 21 is provided in the closed space 19 around the boss 17 to support and be connected to the boss 17, and the boss support rib 21 may be formed to divide the closed space 19 into a plurality of spaces.

Therefore, the sub frame mountings 15 can secure the solid rigidity of the boss 17 by the plurality of closed space 19 and the boss support rib 21 provided around the boss 17, and significantly reduce the weight. Therefore, the fuel economy or electricity efficiency of the vehicle can be improved and cruising range can be increased, and the rigidity required for the vehicle body can be sufficiently provided.

Figure 10:
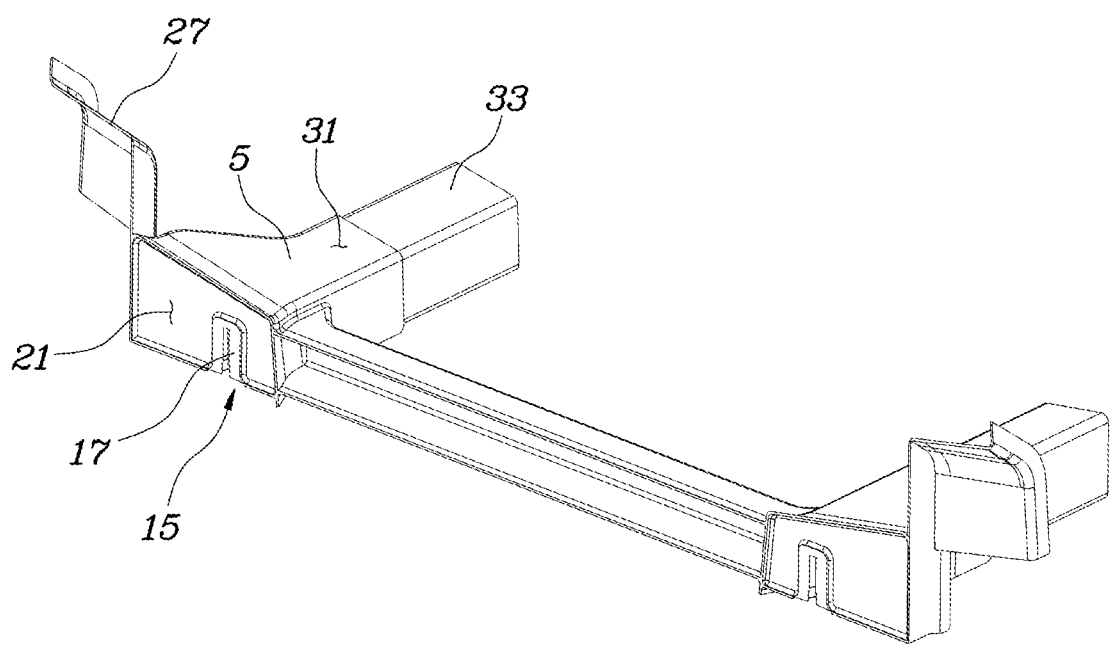

For reference, FIGS. 8 and 9 are sectional views showing a structure of the front sub frame mounting 15, and FIGS. 10 and 11 are sectional views showing a structure of the rear sub frame mounting 15.

For example, manufacturing may be performed by the die casting so that the closed space around the boss may be formed by the salt core.

Figure 12:
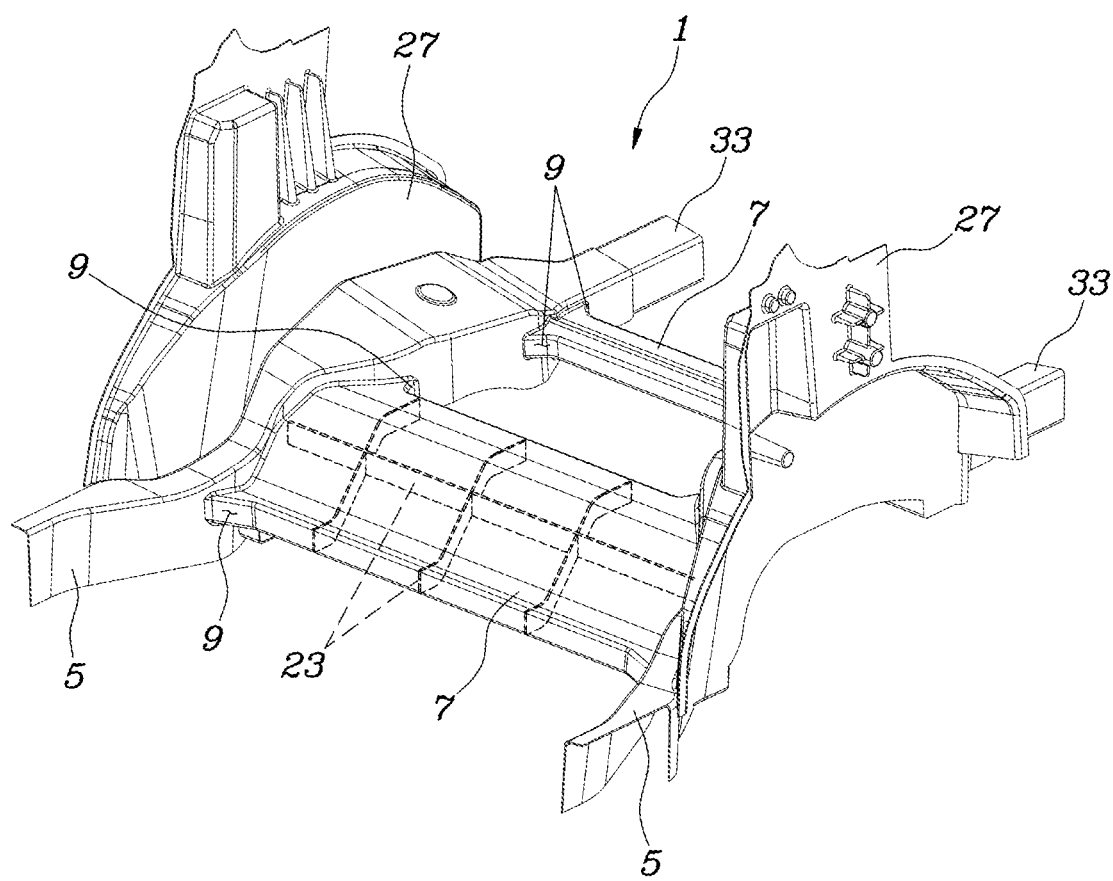
FIG. 12 is a view showing an example of the cross member with a plurality of partition walls provided therein, in the view point of FIG. 1.

Meanwhile, FIG. 12 is a view showing an example in which a plurality of partition walls 23 is provided inside each of the hollow cross members 7 to partition each of the cross members 7 into a plurality of sealed chambers by the plurality of partition walls 23.

When each of the cross members 7 is formed into the structure in which the plurality of sealed chambers is connected to each other by the plurality of partition walls 23, the rigidity of each of the cross members 7 can be significantly improved, and moreover, the rigidity of the underbody 1 may be significantly improved.

Of course, instead of the plurality of partition walls 23, a plurality of member ribs may be provided inside each of the hollow cross members 7, so that the rigidity of each of the cross members 7 can be improved.

In the embodiment, each of the side members 5 is formed such that a portion with the suspension mounting is relatively bent upward; and each of the cross members 7 has a structure consisting a hollow section including an inclined portion 25 that extends gradually downward from the portion with the suspension mounting toward the front side and the rear side of the vehicle body.

Therefore, bending or twisting of the cross members 7 can be efficiently suppressed, and stronger rigidity of the underbody 1 can be secured.

FIG. 1 shows an example in which a wheel housing inner shell 27 is integrally formed at a side upper portion of each of the side members 5, and the underbody 1 may be provided while the wheel housing inner shell 27 is excluded.

Among the front portion and the rear portion of the underbody 1, a first portion is connected to a center floor panel 29 and a shock absorbing member connector 31 may be provided at a second portion.

In other words, in the vehicle body shown in FIG. 2, the underbody 1 is disposed at a rear lower portion of the vehicle body, and the front portion of the underbody 1 is connected to the center floor panel 29, and the rear portion thereof includes the shock absorbing member connector 31 connected to a connection beam 33 connected to the shock absorbing member such as a bumper.

FIG. 2 shows an example in which the underbody 1 is provided at the rear lower portion of the vehicle body, but the underbody 1 may be provided at each of the front and rear portions of the vehicle body. In this case, the shock absorbing member connector is provided in a front portion of the front underbody 1 for connection of a front bumper, and the center floor panel is connected to a rear portion thereof.

Although the preferred embodiment of the present invention has been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. An underbody for a vehicle, the underbody comprising:
   side members extending in a longitudinal direction of a vehicle body of the vehicle, each of the side members being at opposite lateral sides of the vehicle body; and
   hollow cross members extending in a transverse direction of the vehicle body and integrally connected to the side members, wherein a plurality of member ribs are inside each of the hollow cross members, the plurality of member ribs configured to improve rigidity of each of the hollow cross members.

2. The underbody of claim 1, wherein the hollow cross members comprise a plurality of hollow cross members in parallel.

3. The underbody of claim 1, wherein each of the side members comprises a suspension mounting configured to mount a suspension device, wherein the suspension mounting is in a ring shape having a hollow closed section.

4. The underbody of claim 3, wherein the suspension mounting comprises a hollow ring of a form in which a ring-shaped hollow portion extends from an upper portion to a lower portion of each of the side members such that a center portion is open downward.

5. The underbody of claim 4, wherein the hollow cross members comprise two hollow cross members, each of the hollow cross members being perpendicular to the longitudinal direction of the vehicle body, the suspension mounting being disposed between portions of each of the side members to which the hollow cross members are respectively connected.

6. The underbody of claim 5, further comprising sub frame mountings respectively on the portions of each of the side members to which the hollow cross members are respectively connected.

7. The underbody of claim 6, wherein each of the sub frame mountings comprises a boss configured to mount a sub frame, wherein a closed space is provided around the boss.

8. The underbody of claim 7, wherein a boss support rib is provided in the closed space around the boss to support and be connected to the boss.

9. The underbody of claim 8, wherein the boss support rib divides the closed space into a plurality of spaces.

10. The underbody of claim 4, wherein a plurality of ring support ribs is provided at periphery of the hollow ring, and the plurality of ring support ribs is configured to support the hollow ring.

11. The underbody of claim 1, wherein a plurality of partition walls is provided inside each of the hollow cross members, so that an inside space is divided into a plurality of sealed chambers by the plurality of partition walls.

12. The underbody of claim 1, wherein each of the hollow cross members is connected to each of the side members at an enlarged sectional portion, and a section of the enlarged sectional portion is enlarged in a longitudinal direction of each of the side members.

13. The underbody of claim 1, wherein the hollow cross members comprise two hollow cross members that are spaced apart from each other in the longitudinal direction of the vehicle body, each of the side members comprises a suspension mounting between portions thereof, to which the hollow cross members are respectively connected, the suspension mounting configured to support a suspension device, each of the side members having a portion with the suspension mounting relatively bent upward, and each of the hollow cross members comprising of a hollow section including an inclined portion extending gradually downward from the portion with the suspension mounting toward a front portion and a rear portion of the vehicle body.

14. The underbody of claim 1, wherein a wheel housing inner shell is integrally formed at an upper lateral portion of each of the side members.

15. A method of forming an underbody for a vehicle, the method comprising:
    forming side members by die casting, the side members extending in a longitudinal direction of a vehicle body of the vehicle, each of the side members being at opposite lateral sides of the vehicle body;
    forming hollow cross members by the die casting, an inside space of each of the hollow cross members being formed by a salt core in the die casting, the hollow cross members extending in a transverse direction of the vehicle body and integrally connected to the side members; and
    forming sub frame mountings respectively on portions of each of the side members to which the hollow cross members are respectively connected, wherein each of the sub frame mountings comprises a boss configured to mount a sub frame, and wherein a closed space is provided around the boss, the closed space of the boss being formed by the salt core during the die casting.

16. The method of claim 15, wherein each of the side members comprises a suspension mounting configured to mount a suspension device, wherein the suspension mounting is in a ring shape having a hollow closed section, the suspension mounting comprises a hollow ring of a form in which a ring-shaped hollow portion extends from an upper portion to a lower portion of each of the side members such that a center portion is open downward, the ring-shaped hollow portion of the suspension mounting is formed by the salt core during the die casting.

17. A vehicle body that comprises an underbody, the underbody comprising:
    side members extending in a longitudinal direction of the vehicle body, each of the side members being at opposite lateral sides of the vehicle body; and
    hollow cross members extending in a transverse direction of the vehicle body, and integrally connected to the side members; and
    wherein each of the side members comprises a sub frame mounting, each of the sub frame mountings comprising a boss configured to mount a sub frame; and
    wherein a closed space is provided around the boss.

18. The vehicle body of claim 17, wherein the underbody is provided at each of a front portion and a rear portion of the vehicle body.

19. The vehicle body of claim 17, wherein, among a front portion and a rear portion of the underbody, a first portion is connected to a center floor panel, and a shock absorbing member connector is provided at a second portion.

20. The vehicle body of claim 17, wherein a boss support rib is provided in the closed space around the boss to support and be connected to the boss.

* * * * *